July 3, 1956
C. W. REED ET AL
2,753,460
FILM BADGE
Filed Oct. 23, 1952
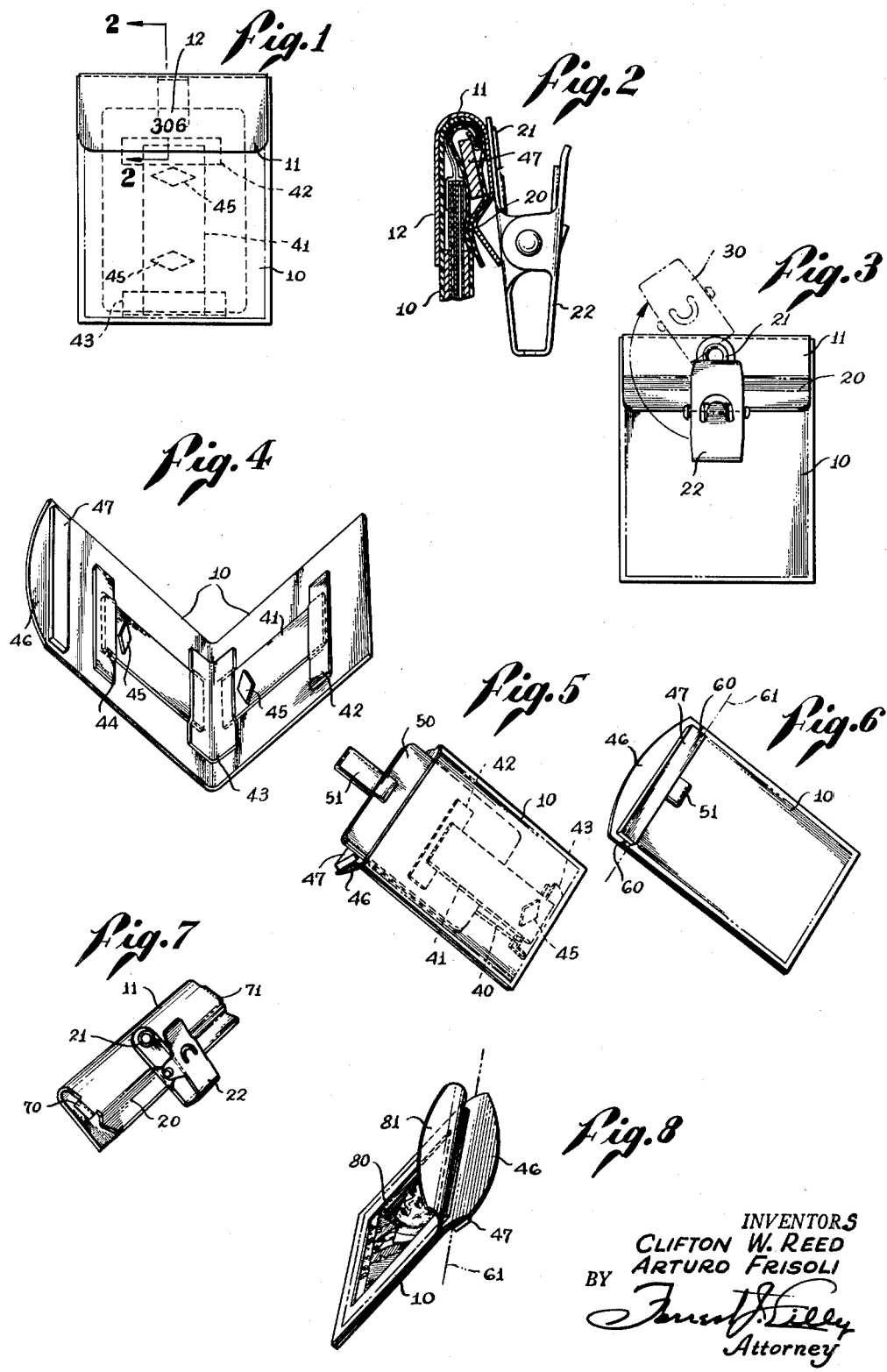
INVENTORS
CLIFTON W. REED
ARTURO FRISOLI
BY
*Attorney*

United States Patent Office 2,753,460
Patented July 3, 1956

2,753,460
FILM BADGE

Clifton W. Reed, Playa del Rey, and Arturo Frisoli, Los Angeles, Calif., assignors, by mesne assignments, to Reed-Curtis Nuclear Industries, Inc., Los Angeles, Calif., a corporation of California Application October 23, 1952, Serial No. 316,466

8 Claims. (Cl. 250—68)

This invention relates to film badges of the type worn by personnel working with or in the vicinity of radioactive material and is particularly directed to an improved type of film badge for indicating the amount of radiation received by the wearer.

Present industrial film badges generally comprise a metallic casing containing a radiation sensitive material, such as a dental film, for example, wrapped in light tight paper. A window is provided in the front face of the metallic casing permitting the film to be exposed to radiation, the badge being pinned to the wearer's clothes and worn throughout the work day. Periodically, the film in the badge is removed and processed, the developed film serving as a record of the quantity of radiation to which the wearer has been exposed. These films are identified as to the wearer by a suitable marking and permanently filed. A new film may then be inserted and the same badge used again.

One of the difficulties with these film badges is that due to their metallic construction they are not only heavy, bulky, and subject to corrosion, but expensive to manufacture. Furthermore, a safety pin type means for securing the badge to the wearer is used, which is not only inconvenient and awkward to attach and detach, but oftentimes results in tearing of the wearer's clothes.

Another difficulty is in the window construction for exposing the film. This window is not always water-tight, frequently resulting in spoiled film when the badge is worn aboard ship, for example, or in other locales where a moisture proof badge is imperative. It is also possible for the film to become light struck through such window, particularly if the relatively fragile paper in which the film is initially wrapped becomes damaged.

Still another difficulty is encountered in the provision of a suitable means for identifying the film with the badge and thus the wearer. In some instances, this has been accomplished by simply pencil marking a number on the film wrapping paper through the window. Marking in this manner however could easily damage or tear the paper and result in the film being light struck. Another system involves perforating the film with a suitable mark after it has been removed from the badge casing. Still another method is to cut numerals in the metal badge casing adjacent the window to permit the indication to be "X-rayed" onto the film by radiation passing through the cut portions. This latter method will positively identify the film with a number corresponding to the number on the badge, but involves the expensive operation of cutting numerals in the casing.

The present invention contemplates a vastly improved film badge so designed as to overcome the above noted difficulties.

More specifically, it is an object of the invention to provide a film badge of novel design which is relatively small, light, economical to manufacture, attractive in appearance, and simple for a wearer to attach or detach.

Another object is to provide a badge that is completely water-tight and light-tight and yet is readily accessible for removal or re-insertion of film.

Still another object is to provide a badge in which a positive film identification means is incorporated in its construction.

Another object is to provide a film badge including in combination, means for mounting a photo or other data concerning the wearer.

Another object is to provide a badge in which it is difficult for unauthorized personnel such as the wearer, to remove the film, but in which the film may be readily removed for processing by a special tool in the hands of authorized personnel.

These and additional objects and advantages of the invention are attained by providing a film badge casing of flexible plastic material which is light, inexpensive, and not subject to corrosion. A separate clip means is provided in the form of a removable metallic member which, when secured to cooperating elements provided on the casing, effects a water-tight seal and provides a means of securing the badge to the wearer. This clip member may have identifying numbers stamped on its front surface which will be "X-rayed" onto the film when the clip is in position. In addition, the clip is designed so as to be difficult to remove except by authorized personnel.

A better understanding of the invention and its several features will be had by referring to the following detailed description of preferred embodiments thereof in conjunction with the accompanying drawings, in which:

Figure 1 is a front view of the improved film badge in assembled form as it would appear on a wearer;

Figure 2 is an enlarged sectional view looking in the direction of the arrows 2—2 of Figure 1;

Figure 3 illustrates a rear view of the badge;

Figure 4 shows the interior of the badge;

Figure 5 shows the badge with its corresponding dental film partially inserted;

Figure 6 is the badge with film inserted just prior to closing and affixing of the clip member;

Figure 7 illustrates in perspective a preferred form of clip member; and

Figure 8 shows a modification of the badge casing for mounting additional identifying means.

Referring now to Figure 1, the film badge is shown as comprising a casing 10 preferably formed from two strips of a flexible plastic such as polyvinyl chloride for example, heat sealed at their side and bottom portions to form a pocket like container. Casing 10 is closed and supported at its upper end by a removable metallic clip member 11. Identifying numerals 12 are preferably stamped on the front surface of the member 11 as shown. The contents of the film badge to be described in detail later are shown in dotted lines.

As best seen in Figure 2 the clip member 11 includes a metallic strip bent along its long dimension to form an inverted U in cross section, the rear face of which includes a longitudinal crimp 20. Secured to this strip, preferably above crimp 20 by ferrule 21, is a fastening means 22 which may take the form of a simple commercial spring biased alligator fastening. As shown in Figure 3, the fastening 22 may be swung about ferrule 21 to any preferred position, such as indicated by the dotted outline 30, and frictionally held in such position by the ferrule. This feature enables the wearer to position the badge conveniently on his clothes or belt.

Referring now to Figure 4, the casing portion 10 of the badge is shown as split open at its sides to disclose clearly its interior. As shown, the badge includes filter means in the form of two strips of metal 40 and 41 which may be cadmium or silver for example, fixed to the inner wall surfaces of the casing 10 by pieces of adhesive 42, 43, and 44. These filter strips are adapted to lie on opposite sides of the dental film pack to be inserted and filter radiation from a portion of the surface of the film pack. Further filtering means in the form of two lead blocks 45, 45 may also be included. Thus, the energy of the radiation falling on the film will be indicated by the relative darkness of the film area under the filters as compared to the film area to the sides of the filters.

The rear portion of the casing 10 includes an extended flap 46 to which is heat sealed on its inner face an elongated bearing element bar 47. Bar 47 serves not only to provide horizontal rigidity to the casing 10 across its top but also cooperates with clip member 11 to effect a water tight seal as will become clear as the description proceeds.

Figure 5 shows the casing in complete form with a dental film pack 50 partially inserted therein. The position of the filter strips 40 and 41 is shown in dotted lines. Film pack 50, which may include several films, is preferably provided with a cloth tab 51 which may be easily grasped for convenience in removing the film pack from the casing.

As shown in Figure 6, the tab 51 lies outside the pocket in the casing 10 after the film pack is completely inserted. It is also to be noted that the pocket opening extends somewhat higher than the lower edge of the bearing element bar 47 as indicated at 60, the bar being heat sealed to flap 46 only along its upper longitudinal edge so that it overlies the pocket opening as shown. Folding of the flap 46 and bar 47 along the fold line designated 61 in Figure 6 thus insures that the pocket opening is adequately closed.

Referring again to Figure 2, when the clip member 11 is now positioned over the flap 46 in folded position, the crimp 20 will fit under the lower edge of the bearing element bar 47 thoroughly insuring the complete closure of the casing pocket.

The front and back portions formed from the bending of the clip member 11 are biased towards each other so that appreciable force is brought to bear on the flap and bar 47. It is found that this closure means results in a completely water tight seal.

In the assembly of the film badge, the completed casing is formed by heat sealing two sections of the casing material at their sides and bottom as already discussed. The bearing element bar 47 may then be heat sealed to the flap 46. The filter strips 40 and 41 are provided with adhesive pieces 42, 43, and 44, the strips being folded together along the middle of adhesive strip 43. They are then easily inserted in the pocket of the casing 10 and pressing of the front and back surfaces of the casing will insure that the strips are respectively secured to the two opposing inner walls. Flap 46 and bar 47 are folded back as shown in Figure 5 and a suitable film pack inserted. With the film pack in position, the flap 46 and bar 47 are folded down over the pocket opening and clip member 11 positioned thereover as described above. Removal of the film is easily effected by simply removing the clip member 11 and pulling the pack out by means of the tab 51.

In operation, the film badge is assembled as explained above and clipped to the wearer's coat or shirt pocket. Radiation from material handled by or in the vicinity of the wearer will be monitored by the dental film, areas of the film not filtered by the strips 40 and 41 receiving a greater amount or a different type of radiation than the remaining areas. The front surface of the clip member 11 extends over the upper portion of the dental film so that the identifying numerals will be "X-rayed" onto the film. It has been discovered in connection with the design of this invention that while the metal clip member will shield a substantial portion of the radiation from the area of the dental film which it overlies, the relatively thinner portions of the metal forming the identifying numerals will pass a sufficiently greater amount of radiation to provide an outline of the numerals on the film. Thus a mere stamping rather than a cutting out of the numerals is all that is necessary. With proper identification on the film itself assured, the badge is periodically collected, the film removed, a new film inserted, and the badge returned to the wearer. The removed film is then processed and studied to ascertain whether the particular wearer is being exposed to too much radiation.

Figure 7 illustrates a modified type of clip member 11 in which the rear portion of the metallic strip is cut along each vertical side to form tabs 70 and 71 which are bent inwardly. These tabs will prevent the wearer or other unauthorized person from sliding the clip off the casing. The clip member may be made of hard spring steel so that with the construction of Figure 7 the only way to remove it would be to lift it straight up by separating the front and rear bent portions so that crimp 20 will be free of the lower edge of the bearing element bar 47. If the member is made of a tough springy steel this could only be accomplished easily by a suitable expanding tool adapted to engage the under surfaces of the member to separate them. This tool may be kept in the hands of authorized personnel only. An added advantage of a tightly biased clip member is the added force and thus sealing effect that would result on the flap 46 and bar 47.

Figure 8 illustrates a modification of the casing portion of the film badge consisting of an additional pocket formed from a transparent plastic material 80 suitably heat sealed to the front of casing 10 at its sides and bottom and including a flap 81 adapted to overlie the flap 46. A photo or other identification of the wearer may be inserted in this pocket and retained in place by folding the flap 81 with the flap 46 under the clip member. Alternatively, the photo may be inserted when the casing is being fabricated and the top of the photo pocket permanently heat sealed closed when the bar 47 is heat sealed in position. In this instance the flap 81 would be unnecessary. In either construction, however, the identifying photo will be sealed against moisture. Incorporating identifying means of this nature in the film badge eliminates the necessity of a worker wearing two badges—one to monitor radiation and the other to identify the worker.

Several advantages of the present film badge constructed as explained in connection with Figures 1 to 8 are to be noted. Not only is the plastic casing corrosion resistant to most chemicals but additionally it is light, not bulky, may be provided in a variety of colors, and is economical to manufacture. The use of the bearing element bar 47 not only insures a water and light tight seal but additionally provides horizontal stiffening of the casing, preventing undue flexing of the film pack. The novel arrangement and positioning of the filter strips provides the necessary vertical stiffening. However, the fact that the plastic casing is in itself flexible is advantageous in that it permits easy insertion and removal of one or more film packs as well as easy insertion of suitable filter strips.

The feature of a detachable clip member, not only simplifies the construction, but combines the functions of providing a tight seal, yet easy access to the film, an attractive, simple and adjustable fastening means for affixing the badge to the wearer, and identifying numerals which are automatically reproduced on the film.

Modifications of the film badge within the spirit of the present invention will occur to those skilled in the art. The invention is therefore not intended to be limited to the precise embodiments disclosed.

We claim:

1. In a film badge adapted to retain a film pack sensitive to radiation, the combination comprising at least two sections of material sealed together along their side and bottom portions to form a flexible casing defining an opening along its upper edge, one of said sections of material including an extension beyond said opening in the form of a flap, a bearing element comprising an elongated bar sealed along its upper edge to said flap in a position to overlie said opening, and a clip member including a strip bent along the middle of its long dimension to define front and rear faces biased towards one another, the rear face including a longitudinal crimped portion, said strip being adapted to fit over said flap and bearing element whereby the crimped portion lies under the lower longitudinal edge of said bearing element and in cooperation with said flap and bearing element effects a water tight closing of said casing opening.

2. A film badge according to claim 1, in which said clip member includes a fastening means rotatably secured to said spring strip.

3. A film badge according to claim 1, in which said flexible casing includes filter means in the form of metal strips vertically secured to the opposing inner walls of said casing, whereby in combination with said bearing element, vertical and horizontal stiffening of said flexible casing is obtained.

4. A film badge according to claim 1 in which the front face of said strip includes identifying symbols stamped thereon at a point overlying said pocket opening when said strip is in position.

5. A film badge comprising in combination: a flexible casing defining a pocket and a normally upper pocket opening, flap means extending above said pocket opening and adapted to be folded thereover, a rigid bearing bar fixed along its upper edge to said flap means above said opening and having its lower edge extending slightly below and coextensive with said opening, and a removable resilient clip member adapted to grip the upper end of said casing over its entire width when said flap means is folded over the pocket opening whereby to seal said opening.

6. A film badge according to claim 5, and fastening means swivelly connected to said clip member for affixing the badge to the wearer's clothes.

7. A film badge according to claim 5 wherein said clip member comprises a pair of resilient arms biased toward one another and between which said upper end of the casing is adapted to be gripped, one of said arms having an inwardly set portion adapted to engage said casing below said bar to normally prevent upward removal of the clip from the casing, and means for normally preventing lateral removal of the clip from the casing.

8. A film badge according to claim 7 wherein said last mentioned means comprises tabs on one of said arms at opposite side edges of the casing and projecting toward the other of said arms.

References Cited in the file of this patent

UNITED STATES PATENTS

| | | |
|---|---|---|
| 1,767,972 | Garretson | June 24, 1930 |
| 2,312,436 | Oldham | Mar. 2, 1943 |
| 2,371,843 | Powers | Mar. 20, 1945 |
| 2,496,218 | Kieffer | Jan. 31, 1950 |
| 2,624,253 | Fairbank | Jan. 6, 1953 |
| 2,687,478 | Land | Aug. 24, 1954 |